United States Patent
Pettersson

(10) Patent No.: US 11,629,480 B2
(45) Date of Patent: Apr. 18, 2023

(54) WORKING EQUIPMENT WITH ELECTRICALLY POWERED HYDRAULICALLY OPERATED ARM ARRANGEMENT

(71) Applicant: Hiab AB, Kista (SE)

(72) Inventor: Robert Pettersson, Hudiksvall (SE)

(73) Assignee: Hiab AB, Kista (SE)

( * ) Notice: Subject to any disclaimer, the term of this patent is extended or adjusted under 35 U.S.C. 154(b) by 0 days.

(21) Appl. No.: 17/343,932

(22) Filed: Jun. 10, 2021

(65) Prior Publication Data
US 2021/0404148 A1    Dec. 30, 2021

(30) Foreign Application Priority Data
Jun. 24, 2020   (EP) .................................... 20182016

(51) Int. Cl.
*E02F 9/22*    (2006.01)
*F15C 1/04*    (2006.01)

(52) U.S. Cl.
CPC .......... *E02F 9/2235* (2013.01); *E02F 9/2296* (2013.01); *F15C 1/04* (2013.01)

(58) Field of Classification Search
CPC .... F15B 2211/6303; F15B 2211/20515; F15B 9/2235; F15B 9/2296; F15C 1/04; B60L 3/0046
See application file for complete search history.

(56) References Cited

U.S. PATENT DOCUMENTS
2020/0062141 A1   2/2020   Lee

FOREIGN PATENT DOCUMENTS

| EP | 2204504 A1 | 7/2010 | |
| EP | 2329155 A | 6/2011 | |
| EP | 3306110 A1 | 4/2018 | |
| WO | WO-2010030830 A1 * | 3/2010 | ............. E02F 9/207 |
| WO | 2010146866 A1 | 12/2010 | |
| WO | 2016060132 A1 | 4/2016 | |
| WO | 2016147269 A1 | 9/2016 | |

OTHER PUBLICATIONS

Extended European Search Report dated Dec. 18, 2020, for corresponding European Patent Application No. 20182016.4.

* cited by examiner

*Primary Examiner* — Abiy Teka
*Assistant Examiner* — Daniel S Collins
(74) *Attorney, Agent, or Firm* — Renner, Otto, Boisselle & Sklar, LLP

(57) ABSTRACT

Working equipment including a hydraulically movable arm arrangement for a crane, an electric motor, a hydraulic pump, and a pump controller. An equipment controller is arranged to determine a maximum flow limit from the pump in dependence of a comparison of a current limit received from a battery system and a current consumption monitored by the pump controller, and to compare the determined limit with required flow of hydraulic fluid from the pump needed to move the movable arm arrangement in accordance with operating signals, and if the result does not fulfil a rule of a set of fluid control rules, the controller adapts the operating signals to reduce flow of hydraulic fluid to at least one of a plurality of actuators according to a rule of a set of adaptation rules, such that at least one rule of the set of fluid control rules is fulfilled.

13 Claims, 2 Drawing Sheets

WORKING EQUIPMENT WITH ELECTRICALLY POWERED HYDRAULICALLY OPERATED ARM ARRANGEMENT

This application claims priority of European Patent Application No. 20182016.4, filed on Jun. 24, 2020, which is hereby incorporated herein by reference.

TECHNICAL FIELD

The present disclosure relates to a working equipment, a working equipment system, and a method of the working equipment. In particular it relates to a working equipment for a crane and provided with an electrically powered hydraulically operated arm arrangement to perform various working assignments.

BACKGROUND

Hydraulic working equipment such as truck mounted cranes may today have an electronic power take-off system. The hydraulic system is then powered by electricity instead of e.g. a diesel engine, which has previously been a commonly used power source for hydraulic working equipment. With an electronic power take-off system for a hydraulic crane, an electric motor powered by a battery may drive a hydraulic pump that is generating a flow of the fluid in the hydraulic system of the crane. In existing solutions in electronic power take-off systems for electrically powered hydraulic equipment, the equipment controller often has a predefined and hence constant flow limit of the fluid in the hydraulic system to adapt the hydraulic functions to. This predefined flow limit is hence independent of the charging level and status of the battery which could lead to a higher flow demand from the equipment than what was possible to produce by the electric motor based on the available capacity of the battery.

The charging level and overall status of the battery that powers the hydraulic system varies during a work assignment with the hydraulic working equipment, and the charging level is of course decreasing during the operation of the equipment. The internal and ambient temperature as well as other factors may also affect the available output from the battery. It is important that a high controllability of the equipment needs to be maintained even though the battery has these limitations.

Some patent documents within this technological field will be presented below and briefly discussed.

WO2016147269A1 discloses a control device for hybrid construction machine wherein a hybrid excavator comprises an arm, a hydraulic pump and a plurality of hydraulic actuators. Further, a battery supplies power to a motor generator and a battery sensor for detecting a voltage, a current and a temperature of the battery is also provided. The vehicle body controller controls the motor generator wherein when the hydraulic load of the hydraulic pump is large and the remaining capacity of the battery calculated by the battery controller is equal to or larger than the predetermined amount, an inverter is controlled to drive the motor generator and performs assist drive of the hydraulic pump. WO2016060132A1 discloses a hybrid construction machinery wherein a front working machine comprises an arm, a boom cylinder and a boom. A hybrid controller includes a hydraulic pump required power estimating unit, a storage battery characteristic upper and lower limit determining unit, a limited charging and discharging power calculating unit and an output command unit for computing values of control commands to be outputted to the pump capacity regulating device, the engine controller, and the inverter. Furthermore, the output command unit calculates the power of the hydraulic pump and power of the hydraulic pump based on at least one of voltage and current among the battery characteristics. Also, a control device for controlling the hydraulic pump and the inverter based on at least one of the voltage or the charging rate of the storage battery is also provided.

US20200062141A1 discloses an apparatus and method for controlling vehicle motor based on temperature of battery wherein a battery monitoring unit to monitor temperature values with the help of a battery temperature sensor is provided. Further, a vehicle control unit that controls a driving/performance of a hydraulic pump motor based on the temperature information provided from the battery monitoring is disclosed.

WO2010146866A1 discloses a hydraulic control device for construction machine wherein a power shovel mechanism includes an arm. Further, a hydraulic control device comprises of hydraulic pumps, an electric motor, a capacity cylinder, a controller and a battery. The controller detects the battery remaining amount from the value of the current supplied from the battery and outputs a capacity change signal to the capacity cylinder according to the detected remaining battery amount. Thereby, according to the capacity change signal the angle of the swash plate of the first and second hydraulic pumps P1, P2 can be changed.

The general object of the present invention is to achieve an improved working equipment, working equipment system, and a method in relation to the equipment, of an electrically powered hydraulic working equipment where the improvement lies in achieving a higher controllability, increased power efficiency and thus operation time, and improved safety. The invention addresses how to adapt the operation of the working equipment's hydraulic system in accordance with the status of the battery.

SUMMARY

The above-mentioned objects are achieved by the present invention according to the independent claims.

Preferred embodiments are set forth in the dependent claims.

As defined by the independent claims, the present invention comprises to dynamically adapt the maximum flow limit of the hydraulic systems of the working equipment in response to the available battery capacity and the current consumption of the electric motor operating the pump. This also implies that the flow available to the hydraulic functions of the equipment preferably may be scaled down in a controlled manner and that the total flow demand from the equipment may be used to control the current consumption of the electric motor while reducing the risk of surpassing the current limit of the battery.

The main advantages of the present invention are that a high controllability of the hydraulic equipment is maintained, despite the limitations of the battery and that the power from the battery is used in a more efficient manner, increasing the utilizing of the battery charge by adapting the flow demand from the hydraulic equipment to it.

The operator will benefit from the high controllability of the movable arm arrangement of the crane, due to the adaption of the flow limit in response to the battery status. The operator and fleet owner will benefit from the efficient use of the battery in that a more effective operating time per battery charge is achieved as the hydraulic equipment may be used at reduced speed but with full controllability even when the battery charge is at lower levels.

The implementation of the working equipment, the working equipment system, and the method according to the present invention may prolong the lifetime of the battery as the power outtake is optimized to the present charge level of the battery. It may then also enable customers to buy smaller battery packs, i.e. cutting costs, with bigger cranes without losing controllability of the crane. In presently applied technique the crane sometimes went from fully functional to not working at all, from one second to another when the charge level of the battery failed to supply the required power. By the present invention the working equipment may instead go from fully functional, to slowing down the speed in the movements, but with maintained high controllability, to not working. This present invention further improves battery powered solutions and make them more attractive to the customers who can benefit from battery powered equipment (low noise, environmental-friendly etc.) while still having maintained controllability, etc.

The equipment controller estimates the hydraulic fluid flow required by the machinery by summarizing the demands from every active hydraulic function at the working equipment.

A hydraulic function is here defined as a function that is operated using hydraulics. Slewing, i.e. turning the crane pillar around its vertical rotation axis, is one example of a hydraulic function of a hydraulic crane. Lifting the first boom relative to the crane pillar is another, as is lifting the second boom relative to the first boom or extending a boom extension of a telescopic boom. In order to perform these hydraulic functions a hydraulic actuator, such as the hydraulic cylinder lifting the first boom relative to the crane pillar, requires pressure and flow of hydraulic fluid. The pressure is load dependent, while the flow of the hydraulic fluid to an actuator is controlled by a corresponding hydraulic valve. The pressure, and/or flow, of the hydraulic fluid may be monitored using pressure or flow sensors at various places in the hydraulic system.

The equipment controller controls the hydraulic valves and hence the inlet and outlet of hydraulic fluid from the hydraulic actuators.

The equipment controller monitors the demanded hydraulic fluid flow from each hydraulic function or actuator by receiving a generally designated actuator monitoring signal 21. The monitoring may be based on signals from pressure or flow sensors in the hydraulic system, signals from the hydraulic valves governing the operation of the hydraulics actuators, the operating signals 18 or from user input received from the operator of the working equipment describing wanted movements of the movable arm arrangement 4. The required flow of hydraulic fluid from each hydraulic function may be estimated based on the above in combination with known dimensions and features of the hydraulic actuators.

The equipment controller further compares the current consumption from the pump controller with the current limit received from the battery, by receiving a battery condition signal. If the consumption of the pump controller is close to the battery current limit the equipment controller limits the flow demand by decreasing the maximum flow limit. The maximum flow limit is the limit for the hydraulic system and in order to comply with the maximum limit the flow to the hydraulic functions may be scaled down. Thus, the equipment controller has a supervising role.

The equipment controller may scale down the flow demand of the different hydraulic functions in a controlled manner, e.g. by reducing the flow demand of the first boom cylinder and second boom cylinder with equal percentages for an example of a hydraulic crane. This may be performed through operating signals to the hydraulic valves controlling the actuators. In this example the first boom cylinder and second boom cylinder would move in the same manner relative to each other, as before the reduction, but with reduced speeds. The crane operator would then be able to operate the crane and achieve the expected movements, but with reduced speed in the movements. The controllability is hence maintained even though the speed in the movements is reduced, as the crane operator achieves the expected or essential movements of the crane.

Another advantage with the invention is that by ensuring that the combined flow demand from the hydraulic functions is compliant with the maximum flow limit is that the pump controller may be further configured to control the operation of the electric motor and/or the hydraulic pump to make available the required flow or corresponding pressure level of hydraulic fluid from the pump, without risking to damage the battery or other components of the system. Depending on the set up of the hydraulic system and the choice of pump type the pump controller may manage and adapt the pressure of the hydraulic fluid instead of the flow. A pressure level corresponding to the flow demand may then be calculated by the equipment controller or the pump controller. This also implies that the electric motor and/or pump may be operated according to the need from the hydraulic functions, which also means that the battery will be used in an efficient manner not putting in more energy than needed.

DETAILED DESCRIPTION

The working equipment, the working equipment system, and the method of operating the working equipment, will now be described in detail with references to the appended figures. Moreover, the items and the figures are not necessarily to scale, emphasis instead being placed upon illustrating the principles of the invention.

The present invention is preferably applicable on a hydraulically operated crane that may comprise a crane pillar rotatable around a vertical axis. A first boom may be attached to the crane pillar and may be lifted relative the crane pillar. A second boom may further be provided that may be an extendible telescopic boom attached to the first boom. A hydraulically operated working tool is advantageously arranged, e.g. at a tip of the telescopic boom. Movements of one or many of these various parts are normally hydraulically operated.

Figure 1:
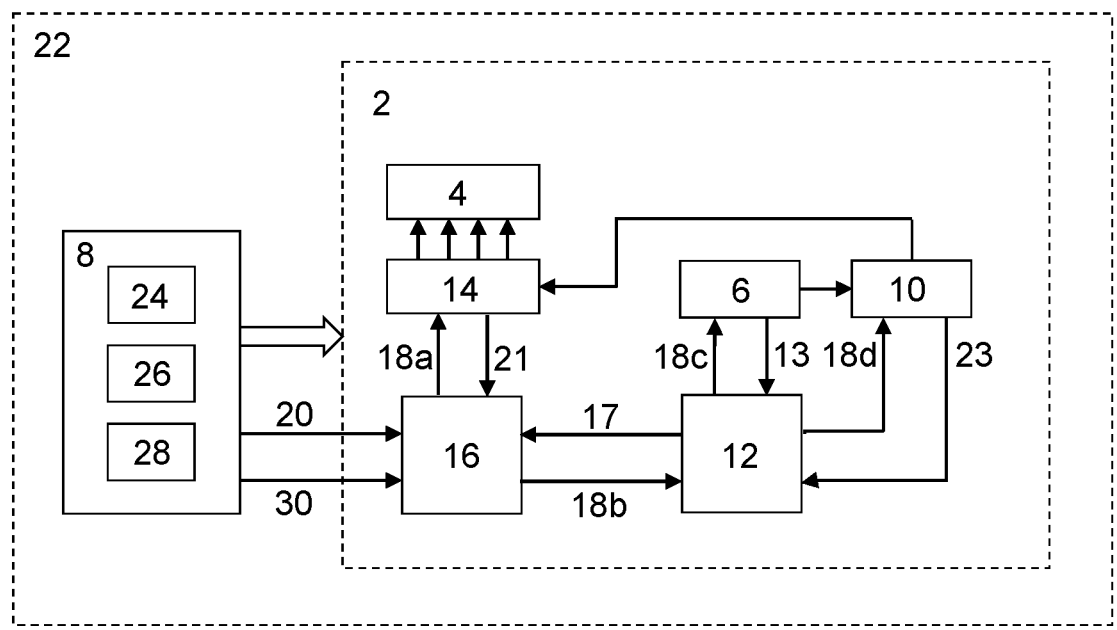
FIG. 1 is a block diagram schematically illustrating the working equipment, and the working equipment system according to the present invention.

With references to FIG. 1, a working equipment 2 is provided that comprises a hydraulically movable arm arrangement 4. Examples of such a working equipment may be a crane or a hooklift or other working equipment mounted to a truck. It may further be a working equipment in the form of a vehicle such as a forklift.

The movable arm arrangement may comprise one or many hydraulically moveable booms, telescopic booms, and hydraulically actuated working tools, e.g. grapples, hydraulic hooks or brick grabs mounted on a boom tip.

At least one electric motor 6 is arranged to be powered by a battery system 8, and at least one hydraulic pump 10 is arranged to be operated by the electric motor 6, which is indicated by an arrow. The electric motor may be a speed controlled electric motor having variable or fixed speed. Also other types of electric motors are applicable herein provided they can be operated to control a hydraulic pump.

The hydraulic pump may be a fixed pump and/or a variable displacement pump, and if many pumps are used, a mixture of fixed pumps and variable displacement pumps may be applied. Also other types of hydraulic pumps are applicable herein.

The working equipment also comprises a pump controller 12 configured to control the electric motor 6 and/or the hydraulic pump 10, and to monitor the current consumption 13 of the at least one electric motor 6, and also to monitor various parameters 23 of the hydraulic pump 10. The electric motor and the hydraulic pump may form an integrated unit or form separate parts.

A plurality of actuators 14 are arranged to be operated by hydraulic fluid discharged from the at least one hydraulic pump 10 and further arranged to move the movable arm arrangement 4 during a working assignment. This is schematically indicated by arrows from the actuators 14, and the pump 10 via the actuators 14, to the arm arrangement 4. The actuators may comprise hydraulic cylinders, to and from which the hydraulic fluid is controlled by hydraulic valves. By controlling an hydraulic valve the piston side chamber of a cylinder may e.g. be filled with hydraulic fluid pushing the piston and causing a piston rod to e.g. move a boom of a crane. In the schematic of FIG. 1, the actuators 14 further comprise these hydraulic valves. Operating signals 18a controlling the flow and/or pressure of hydraulic fluid to the plurality of actuators 14, may hence be received and executed by the hydraulic valves.

The working equipment comprises an equipment controller 16 configured to control movement of the movable arm arrangement 4 by generating the operating signals 18, which in FIG. 1 are indicated as different operating signals 18a, 18b, 18c, and 18d. The operating signal 18a is configured to control the flow of hydraulic fluid to hydraulic controlling valves controlling the flow of hydraulic fluid to or from the plurality of actuators 14. The operating signal 18b is applied to the pump controller 12 that in its turn controls the electric motor 6 by operating signal 18c, and/or the hydraulic pump 10 by operating signal 18d, to control the flow of hydraulic fluid (or corresponding pressure) generated by the pump 10. The at least one pump 10 is hydraulically connected to the various actuators by hydraulic connection means such as pipes and hoses in accordance with generally applied techniques.

The equipment controller 16 and the pump controller 12 are illustrated as separate units. However, it may also be possible that these controllers are realized as an integrated unit, or that the equipment controller 16 and/or pump controller 12 are distributed on a plurality of units. These controllers have the necessary processing capacities, communication capabilities, and all other functions required to perform their respective task.

The equipment controller 16 is configured to receive a battery condition signal 20 comprising a presently available current limit from the battery system 8 which is arranged to power the at least one electric motor 6. The electric power to be supplied to the electric motor is schematically illustrated in FIG. 1 as a block arrow.

The battery system 8 is not part of the working equipment, but is included in the working equipment system which will be discussed below. However, it comprises a battery 24, e.g. a battery pack, for supply of current, and further a battery controller 28 and battery sensors 26. By using input from the battery sensors the battery controller is configured to measure e.g. cell voltages and cell temperatures to determine the battery health. Based on the battery's health condition, the battery controller calculates a current limit for the battery pack. The current limit represents the present discharge that can be made from the battery pack without drastically shortening the lifetime of the battery. That is one standardized method for the supplier to provide a lifecycle guarantee for the battery. The battery controller outputs the current limit in ampere, and optionally also error and/or warning alerts, e.g. if the electric motor should be stopped based on the condition of the battery.

The equipment controller 16 is further configured to monitor the required flow of hydraulic fluid from the a least one pump 10 needed to move the movable arm arrangement 4 in accordance with the operating signals 18. The monitoring may be based on signals from pressure or flow sensors in the hydraulic system, signals from the hydraulic valves governing the operation of the hydraulics actuators, the operating signals 18 or from user input received from the operator of the working equipment describing wanted movements of the movable arm arrangement 4. Thus, the monitoring is based upon information in an actuator condition signal 21 received from the actuators, a signal 17 received from the pump controller 12, and from a current consumption 13 monitored by the pump controller, and various parameters 23 from the hydraulic pump 10. The required flow of hydraulic fluid from each hydraulic function may be estimated based on the above in combination with known dimensions and features of the hydraulic actuators.

The equipment controller 16 is arranged to determine a maximum flow limit of the hydraulic fluid from the at least one pump in dependence of a comparison of the current limit received from the battery system 8 and the current consumption 13 monitored by the pump controller 12.

And then, the equipment controller 16 is configured to compare the determined maximum flow limit with the required flow of hydraulic fluid from the at least one pump 10 needed to move the movable arm arrangement 4 in accordance with the operating signals.

If the result of the comparison does not fulfil at least one rule of a set of fluid control rules, the equipment controller 16 is configured to adapt the operating signals 18, i.e. one or many of operating signals 18a, 18b, 18c, and 18d, to reduce the flow of hydraulic fluid to at least one of the plurality of actuators 14 according to at least one rule of a set of adaptation rules, such that at least one rule of said set of fluid control rules is fulfilled.

According to one embodiment, if the monitored current consumption 13 is larger than the current limit, the maximum flow limit of the hydraulic fluid is set to a value corresponding to the current limit. The value corresponding to the current limit, is the value of the hydraulic fluid flow if the current limit of the battery is applied. The flow value corresponding to the current limit of the battery may be estimated using a known relationship from calibrations and/or theory. A value may be calculated or fetched from a table of stored values; stored values may e.g. be further processed using interpolation techniques.

As an alternative, the maximum flow limit may be lowered step-wise in one or many preset intervals until the current consumption is lower than the current limit.

According to another embodiment, the set of fluid control rules comprises at least one of:
  the required flow of hydraulic fluid is lower than the received maximum flow limit;
  the required flow of hydraulic fluid is at least 5-15% lower than the received maximum flow limit.

According to another embodiment, the set of adaptation rules comprises at least one of:
  a scaling down rule comprising to generate operating signals 18 to reduce the flow of hydraulic fluid to the plurality of actuators 14 by a preset reduction factor, e.g. 10%, 20%, 30%, etc.;
  a priority rule comprising to generate operating signals 18 to reduce the flow of hydraulic fluid to the plurality of actuators 14 according to a priority list where actuators having higher priority have no or low reduction and actuators having lower priority have high reduction;

Naturally, these rules may be combined, e.g. a highly prioritized telescope boom may be controlled to move at a lower speed.

In still another embodiment, the pump controller 12 is further configured to control the operation of the electric motor 6 and/or the hydraulic pump 10 to make available the required flow of hydraulic fluid from the pump.

This may be achieved by the pump controller by receiving information of required flow of hydraulic fluid from the equipment controller. Depending on the configuration of the hydraulic system and the choice of pump, the pump may be arranged to control the pressure of the hydraulic fluid instead of the flow. The equipment controller or the pump controller may then estimate a pressure corresponding to the required flow for the pump. As an alternative, the pump controller is configured to ascertain that the electric motor 6 and/or the hydraulic pump 10 maintain the pressure of the hydraulic fluid that is dependent on, and governed by, the operation of the actuators.

The present invention also relates to a working equipment system 22 which will be described with references to FIG. 1. The working equipment system 22 comprises a working equipment according to the above description, and it is here referred to that description. In addition the system 22 comprises, as described above, a battery system 8 including a battery 24, a sensor system 26 for measuring parameters related to a battery condition of the battery, and a battery controller 28 configured to generate a battery condition signal 20 comprising the presently available current limit for the battery in response to the measured parameters related to the battery condition. The battery system 8 has been described above in relation to the description of the working equipment, and it is referred to that description. The battery system 8 may be provided with a standard interface including a specific communication protocol defining e.g. the format of the battery condition signal.

In a further embodiment of the working equipment system 22 the battery controller 28 is further arranged to generate an alert signal 30 in response to the measured parameters related to the battery condition indicating a malfunction state of the battery 24. The alert signal 30 may be either a separate signal, or may be integrated in the battery condition signal 20. The equipment controller 16 is further arranged to determine the maximum flow limit of the hydraulic fluid from the pump 10 to a predetermined alert level in response of receipt of the alert signal 30 from the battery controller 28. The predetermined alert level is preferably considerably lower than the present maximum flow limit. In that case the adaptation rules may include one or many rules applicable when an alert signal has been received that may include to have a specific priority order of the actuators to be applied. Thus, the equipment controller may be configured to react to errors and warnings sent from the battery and limit the flow demand in all situations regardless of current consumption. In addition, an alarm signal may be generated to alert the machine operator that something is happening. The operator may then be recommended to e.g. park the working equipment.

Figure 2:
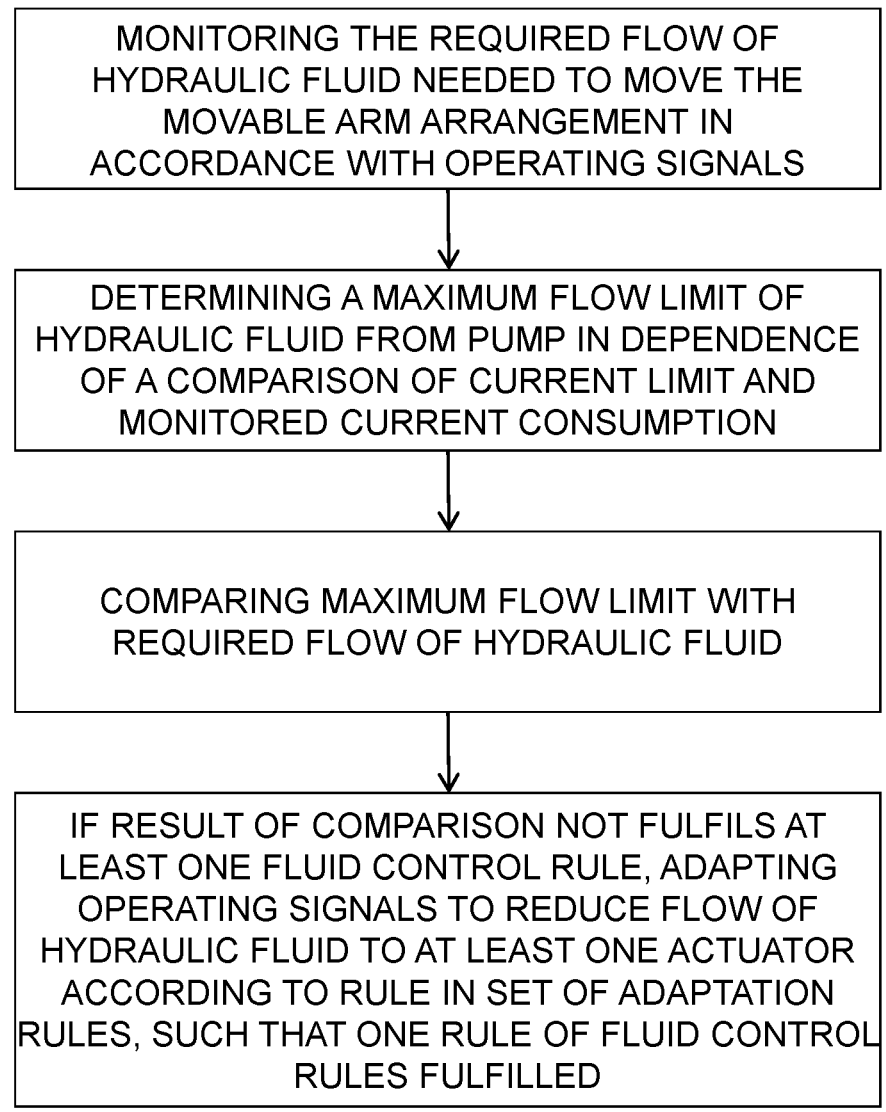
FIG. 2 is flow diagram illustrating the method according to the present invention.

The present invention also relates to a method of a working equipment 2. The method will be described with references to the flow diagram shown in FIG. 2. The working equipment has been described in detail above and it is herein referred to that description.

Thus, the working equipment 2 comprises a hydraulically movable arm arrangement 4 for a crane, and at least one electric motor 6 arranged to be powered by a battery system 8, at least one hydraulic pump 10 arranged to be operated by the electric motor 6, and a pump controller 12 configured to control the electric motor 6 and/or the hydraulic pump 10, and to monitor the current consumption 13 of the at least one electric motor 6.

A plurality of actuators 14 are provided, arranged to be operated by hydraulic fluid discharged from the at least one hydraulic pump 10 and further arranged to move the movable arm arrangement 4 during a working assignment. An equipment controller 16 is also provided, configured to control movement of the movable arm arrangement 4 by generating operating signals 18 controlling the flow and/or pressure of hydraulic fluid to the plurality of actuators 14, and to receive a battery condition signal 20 comprising a presently available current limit from the battery system 8 arranged to power the at least one electric motor 6.

The method comprises monitoring, by the equipment controller 16, the required flow of hydraulic fluid from the at least one pump 10 needed to move the movable arm arrangement 4 in accordance with the operating signals.

The method further comprises determining, by the equipment controller 16, a maximum flow limit of the hydraulic fluid from the at least one pump in dependence of a comparison of the current limit received from the battery system 8 and the current consumption 13 monitored by the pump controller 12.

Furthermore, the method comprises comparing, by the equipment controller 16, the determined maximum flow limit with the required flow of hydraulic fluid from the at least one pump 10 needed to move the movable arm arrangement 4 in accordance with the operating signals.

If the result of the comparison does not fulfil at least one rule of a set of fluid control rules, the method comprises adapting the operating signals 18 to reduce the flow of hydraulic fluid to at least one of the plurality of actuators 14 according to at least one rule of a set of adaptation rules, such that at least one rule of said set of fluid control rules is fulfilled.

If the monitored current consumption 13 is larger than the current limit, the maximum flow limit of the hydraulic fluid is preferably set to a value corresponding to the current limit.

In a further embodiment, the set of fluid control rules comprises at least one of:
  the required flow of hydraulic fluid is lower than said received maximum flow limit;
  the required flow of hydraulic fluid is at least 5-15% lower than said received maximum flow limit.

In still another embodiment, the set of adaptation rules comprises at least one of:

a scaling down rule comprising to generate operating signals 18 to reduce the flow of hydraulic fluid to the plurality of actuators 14 by a preset reduction factor;

a priority rule comprising to generate operating signals 18 to reduce the flow of hydraulic fluid to the plurality of actuators 14 according to a priority list where actuators having higher priority have no or low reduction and actuators having lower priority have high reduction, The method preferably comprises controlling, by the pump controller 12, the operation of the electric motor 6 and/or the hydraulic pump 10 to make available the required flow of hydraulic fluid from the pump.

In still another embodiment the method comprises determining, by the equipment controller 16, the maximum flow limit of the hydraulic fluid from the pump 10 to a predetermined alert level in response of receipt of an alert signal 30 in response to a battery condition indicating a malfunction state of a battery 24 in the battery system 8. The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A working equipment comprising:
a hydraulically movable arm arrangement for a crane,
at least one electric motor arranged to be powered by a battery system, at least one hydraulic pump arranged to be operated by the at least one electric motor, and a pump controller configured to control the electric motor and/or the hydraulic pump, and to monitor the current consumption of the at least one electric motor;
a plurality of actuators, arranged to be operated by hydraulic fluid discharged from the at least one hydraulic pump and further arranged to move the hydraulically movable arm arrangement during a working assignment, wherein the battery system has an associated available current limit that decreases as the at least one electric motor powers the at least one hydraulic pump to operate the actuators to move the hydraulically movable arm arrangement, and
an equipment controller configured to control movement of the movable arm arrangement by generating operating signals controlling a flow and/or pressure of hydraulic fluid to the plurality of actuators, and to receive a battery condition signal comprising a presently available current limit from the battery system, wherein the equipment controller is further configured to monitor the required flow of hydraulic fluid from the at least one hydraulic pump needed to move the movable arm arrangement in accordance with the operating signals, characterized in that the equipment controller is configured to dynamically adapt to decreases in the available current limit of the battery system in that the equipment controller is arranged to determine a maximum flow limit of the hydraulic fluid from the at least one hydraulic pump in dependence of a comparison of the presently available current limit received from the battery system and the monitored current consumption by the pump controller, wherein, the equipment controller is configured to compare said determined maximum flow limit with a required flow of hydraulic fluid from the at least one hydraulic pump needed to move the movable arm arrangement in accordance with the operating signals, and if the result of the comparison does not fulfil at least one rule of a set of fluid control rules, the equipment controller is configured to adapt the operating signals to reduce the flow of hydraulic fluid to at least one of the plurality of actuators according to at least one rule of a set of adaptation rules, such that at least one rule of said set of fluid control rules is fulfilled.

2. The working equipment according to claim 1, wherein, if the monitored current consumption is larger than the current limit, the maximum flow limit of the hydraulic fluid is set to a value corresponding to said current limit.

3. The working equipment according to claim 1, wherein said set of fluid control rules comprises at least one of:
the required flow of hydraulic fluid is lower than said received maximum flow limit;
the required flow of hydraulic fluid is at least 5-15% lower than said received maximum flow limit.

4. The working equipment according to claim 1, wherein said set of adaptation rules comprises at least one of:
a scaling down rule comprising generating operating signals to reduce the flow of hydraulic fluid to the plurality of actuators by a preset reduction factor;
a priority rule comprising generating operating signals to reduce the flow of hydraulic fluid to the plurality of actuators according to a priority list where actuators having higher priority have no or low reduction and actuators having lower priority have high reduction.

5. The working equipment according to claim 1, wherein the pump controller is further configured to control the operation of the electric motor and/or the hydraulic pump to make available the required flow or corresponding pressure of hydraulic fluid from the pump.

6. A working equipment system comprising a working equipment according to claim 1, wherein the battery system includes a battery, a sensor system for measuring parameters related to a battery condition of the battery, and a battery controller configured to generate the battery condition signal comprising the presently available current limit for the battery in response to the measured parameters related to the battery condition.

7. The working equipment system according to claim 6, wherein
the battery controller is further arranged to generate an alert signal in response to the measured parameters related to the battery condition indicating a malfunction state of the battery, and
the equipment controller is further arranged to determine the maximum flow limit of the hydraulic fluid from the pump to a predetermined alert level in response of receipt of the alert signal from the battery controller.

8. A method of a working equipment comprising:
a hydraulically movable arm arrangement for a crane,
at least one electric motor arranged to be powered by a battery system, at least one hydraulic pump arranged to be operated by the electric motor, and a pump controller configured to control the at least one electric motor and/or the hydraulic pump, and to monitor the current consumption of the at least one electric motor;
a plurality of actuators, arranged to be operated by hydraulic fluid discharged from the at least one hydraulic pump and further arranged to move the hydraulically movable arm arrangement during a working assignment, wherein the battery system has an associated available current limit that decreases as the at least one electric motor powers the at least one hydraulic pump to operate the actuators to move the hydraulically movable arm arrangement, and
an equipment controller configured to control movement of the movable arm arrangement by generating operating signals controlling a flow and/or pressure of hydraulic fluid to the plurality of actuators, and to receive a battery condition signal comprising a presently available current limit from the battery system arranged to power the at least one electric motor, wherein the method comprises:

monitoring, by the equipment controller, the required flow of hydraulic fluid from the at least one pump needed to move the movable arm arrangement in accordance with the operating signals, characterized in that the method further comprises:

dynamically adapting to decreases in the available current limit of the battery system by
   determining, by the equipment controller, a maximum flow limit of the hydraulic fluid from the at least one pump in dependence of a comparison of the current limit received from the battery system and the monitored current consumption by the pump controller,
   comparing, by the equipment controller, said determined maximum flow limit with a required flow of hydraulic fluid from the at least one pump needed to move the movable arm arrangement in accordance with the operating signals, and if the result of the comparison does not fulfil at least one rule of a set of fluid control rules, the method comprises adapting the operating signals to reduce the flow of hydraulic fluid to at least one of the plurality of actuators according to at least one rule of a set of adaptation rules, such that at least one rule of said set of fluid control rules is fulfilled.

9. The method according to claim 8, wherein, if the monitored current consumption is larger than the current limit, the maximum flow limit of the hydraulic fluid is set to a value corresponding to said current limit.

10. The method according to claim 8, wherein said set of fluid control rules comprises at least one of:
   the required flow of hydraulic fluid is lower than said received maximum flow limit;
   the required flow of hydraulic fluid is at least 5-15% lower than said received maximum flow limit.

11. The method according to claim 8, wherein said set of adaptation rules comprises at least one of:
   a scaling down rule comprising generating operating signals to reduce the flow of hydraulic fluid to the plurality of actuators by a preset reduction factor;
   a priority rule comprising generating operating signals to reduce the flow of hydraulic fluid to the plurality of actuators according to a priority list where actuators having higher priority have no or low reduction and actuators having lower priority have high reduction.

12. The method according to claim 8, comprising controlling, by the pump controller, the operation of the at least one electric motor and/or the hydraulic pump to make available the required flow or corresponding pressure of hydraulic fluid from the at least one hydraulic pump.

13. The method according to claim 8, comprising determining, by the equipment controller, the maximum flow limit of the hydraulic fluid from the at least one hydraulic pump to a predetermined alert level in response of receipt of an alert signal in response to a battery condition indicating a malfunction state of a battery in said battery system.

\* \* \* \* \*